(12) United States Patent
Kawamura et al.

(10) Patent No.: US 10,702,891 B2
(45) Date of Patent: Jul. 7, 2020

(54) DEVICE EQUIPPED WITH OPTICAL UNIT

(71) Applicants: SATAKE CORPORATION, Tokyo (JP); GENESIA CORPORATION, Tokyo (JP)

(72) Inventors: Yoichi Kawamura, Tokyo (JP); Nobuyoshi Ikeda, Tokyo (JP); Norihide Takeyama, Tokyo (JP); Yoshikazu Kanai, Tokyo (JP)

(73) Assignees: SATAKE CORPORATION, Tokyo (JP); GENESIA CORPORATION, Tokyo (JP)

( * ) Notice: Subject to any disclaimer, the term of this patent is extended or adjusted under 35 U.S.C. 154(b) by 190 days.

(21) Appl. No.: 15/755,459

(22) PCT Filed: Aug. 29, 2016

(86) PCT No.: PCT/JP2016/075199
§ 371 (c)(1),
(2) Date: Feb. 26, 2018

(87) PCT Pub. No.: WO2017/038766
PCT Pub. Date: Mar. 9, 2017

(65) Prior Publication Data
US 2018/0250713 A1  Sep. 6, 2018

(30) Foreign Application Priority Data

Aug. 28, 2015 (JP) .................................. 2015-169251

(51) Int. Cl.
*B07C 5/342* (2006.01)
*G01N 21/85* (2006.01)
(Continued)

(52) U.S. Cl.
CPC ............ *B07C 5/3425* (2013.01); *B07C 5/342* (2013.01); *G01N 21/85* (2013.01); *G01N 21/94* (2013.01); *G01N 21/95* (2013.01)

(58) Field of Classification Search
CPC ........ G01N 21/85; G01N 21/94; G01N 21/95; B07C 5/342; B07C 5/3425
(Continued)

(56) References Cited

U.S. PATENT DOCUMENTS 5,355,210 A * 10/1994 Keren ................ G01M 11/0228
                                                  356/124
5,563,709 A * 10/1996 Poultney ................ G01B 11/06
                                                  356/613
(Continued)

FOREIGN PATENT DOCUMENTS

| JP | H07198620 A | 8/1995 |
| JP | 2006234744 A | 9/2006 |
| JP | 2007283204 A | 11/2007 |

OTHER PUBLICATIONS

Japanese Offical Action, dated Dec. 14, 2015.
International Search Report, PCT/JP2016/075199, dated Nov. 22, 2016.

*Primary Examiner* — Terrell H Matthews
(74) *Attorney, Agent, or Firm* — Porzio Bromberg & Newman P.C.

(57) ABSTRACT

By using an offset parabolic concave mirror as a concave mirror, and arranging a lens having an entrance pupil at the geometric focal point of the offset parabolic concave mirror, a group of rays incident parallel to the optical axis of the offset parabolic concave mirror become chief rays which are telecentric with respect to an object plane orthogonal to the optical axis of the offset parabolic concave mirror, and diverging light from each object point on the object plane can be detected on a quadric image plane formed by the lens (Continued)

at the focal point of the offset parabolic concave mirror without blind spots. An image of the target object is detected after the beams reflected by the offset parabolic concave mirror are bent by the reflecting mirrors and made incident on the lens to reduce the size and cost of the device.

13 Claims, 13 Drawing Sheets

(51) Int. Cl.
 *G01N 21/94* (2006.01)
 *G01N 21/95* (2006.01)
(58) Field of Classification Search
 USPC .................................. 209/576, 577, 579
 See application file for complete search history.

(56) References Cited

U.S. PATENT DOCUMENTS

| | | | | |
|---|---|---|---|---|
| 5,795,057 | A * | 8/1998 | Weigert | F21S 8/00 |
| | | | | 362/268 |
| 6,819,411 | B1 * | 11/2004 | Sharpe | G01N 15/1436 |
| | | | | 250/461.2 |
| 8,609,422 | B2 * | 12/2013 | Durack | C12N 5/0612 |
| | | | | 436/63 |
| 2006/0219875 | A1 * | 10/2006 | Yamada | G01S 7/4811 |
| | | | | 250/221 |
| 2007/0069127 | A1 * | 3/2007 | Okuda | H01J 37/21 |
| | | | | 250/310 |
| 2016/0013244 | A1 * | 1/2016 | Sutton | G02B 15/00 |
| | | | | 438/73 |
| 2018/0066987 | A1 * | 3/2018 | Swanson | G02B 13/08 |

* cited by examiner

FIG.5
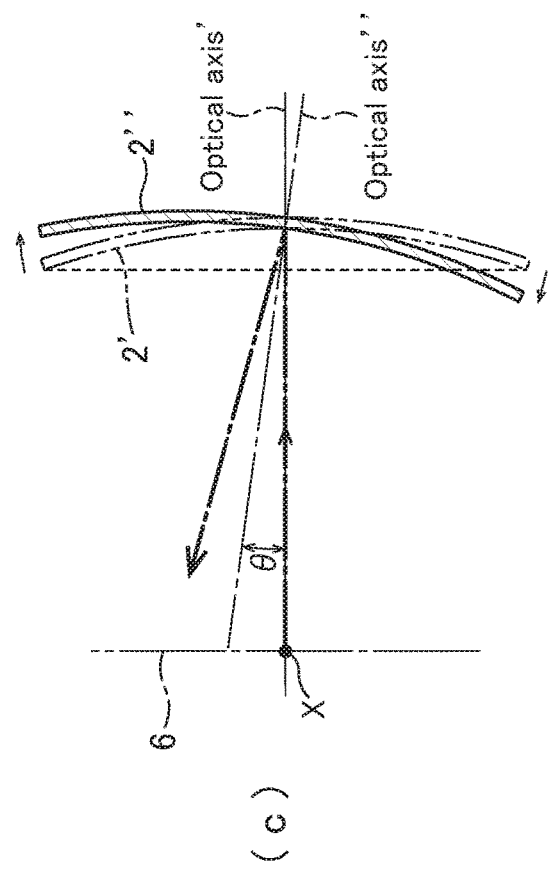
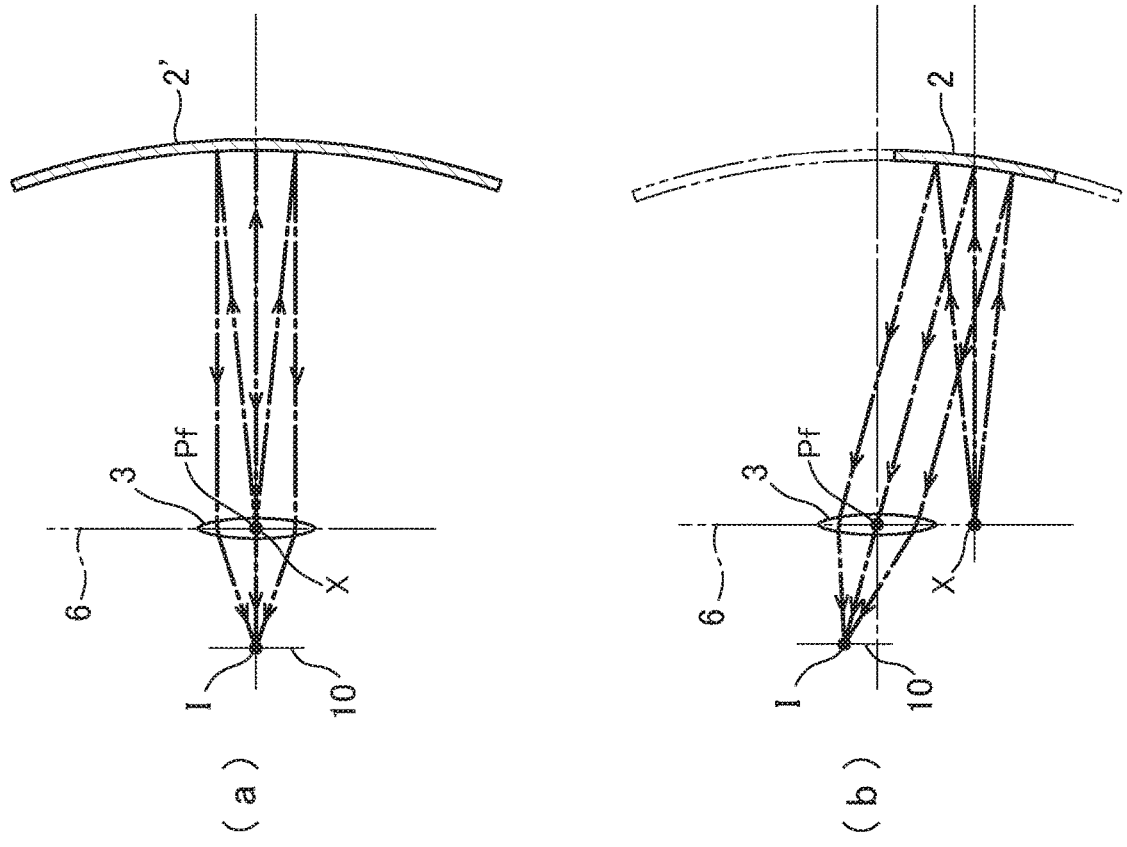

(a)　　　(b)　　　(c)　　　(d)

FIG.10
(a)
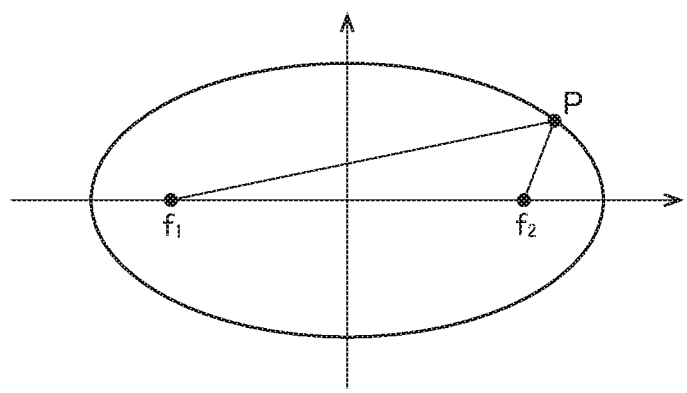
(b)
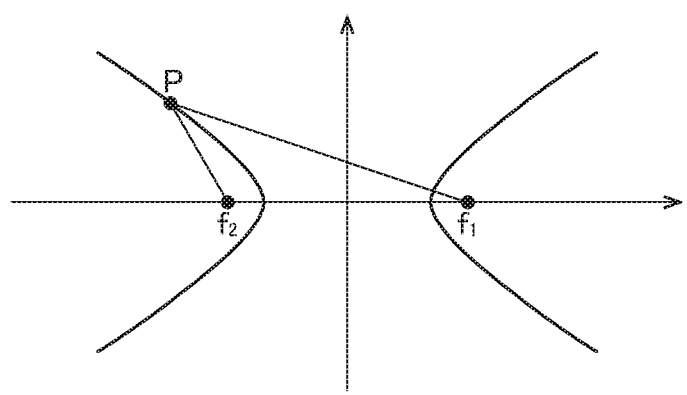

DEVICE EQUIPPED WITH OPTICAL UNIT

TECHNICAL FIELD

The present invention relates to a device for determining the type and quality of granular materials such as grains or resin pellets, or alternatively sheet-like products such as nori, and more particularly relates to technology regarding the structure of an optical unit for optically detecting of a defective piece or unexpected foreign material.

BACKGROUND ART

In the related art, sorting machines for selecting grains such as rice and soybeans, resin pellets, coffee beans, and other granular target objects based on the predetermined criteria such as color and size are known.

The sorting machines may selectively removing mixed-in the unexpected foreign material (see Patent Document 1 below).

The sorting machine may pour the target objects into an inclined chute from above position to be dropped through the chute. The one or a pair of optical units positioned across the downward trajectory in the sorting machine may capture images of the granular objects while their falling. Based on an inspection result of the optical unit, target objects that are determined to be foreign materials or outside the criteria are conveyed by the force of the air ejected from an ejector nozzle to a storage tank separate from the storage tank in which target objects within the criteria are dropped and stored. This also applies for target objects on a conveyor, and objects that the optical unit detects as foreign materials or outside the criteria are conveyed by the another conveyor so as to be distinguishable from the target objects within the criteria.

In addition, a granular object sorting device is disclosed, in which light from a measurement target region is reflected by a reflector, the optical pass is bent by another reflector, and the bended light is received at a light-receiving device (see Patent Document 2 below).

CITATION LIST

Patent Literature

Patent Document 1: JP 2007-283204 A
Patent Document 2: JP 2006-234744 A

SUMMARY OF INVENTION

Technical Problem

As illustrated in the cross-sectional view of the sorting device depicted in FIG. 2 of Patent Document 1, known optical units require a pair of cameras and a pair of light sources installed so as to face each other across the downward trajectory of the target object in order to image multiple sides of a granular target object. In order to increase the sorting efficiency when imaging target objects using such an optical system without introducing blind spots, it is desirable to capture images of all object points on the object plane of the target object. Accordingly, it is preferable to capture images from a "direct downward view" which is a direction of orthogonal to or approximately orthogonal to the surface of flowing each object point on the object plane downward. Therefore, in known sorting machines, the camera is used to be arranged at a position distanced far away from the downward trajectory. As a result, there is a tendency for the optical units to be large in size, such that the sorting machine as a whole also inevitably becomes larger. Further, this leads to problems where, when detection is based on imaging from a position that is far away, the detection accuracy may also decline.

In order to mitigate this problem, a method for attempting to realize a configuration that is close to a direct downward view by narrowing the viewing angle while keeping the measurement target area wide; that is, a method for considerably separating the measurement target region J from the light receiving means 5, is disclosed in Patent Document 2. However, with this method, the size of device tends to become larger. In view of this, Patent Document 2 further describes a configuration in which reflectors 10 and 10A are inserted into the optical path between the measurement target region J and the light receiving means 5 to reflect the light from the measurement target region, and thereafter second reflectors 11, 11A further reflect the light toward the light-receiving device 5, by which the optical path may be bent in the direction of the optical axis and the entire device may be downsized.

Here, as easily understood from FIG. 15 and FIG. 16 of Patent Document 2, the second reflectors 11 and 11A will block, from among the light from the measurement target region J, the light from behind that corresponds to the second reflector portion. Accordingly, FIG. 2 of Patent Document 2 suggests that the reflecting surface be tilted such that the light from the measuring target region J is not blocked by the reflector portion, and that the optical path be bent in a direction orthogonal to the measurement target region.

Such an arrangement for optical elements achieves the effect of bending the optical path in the optical axis direction without being accompanied by optical aberration as long as the reflector is flat. However, as flat reflecting mirrors cannot operate on the angle formed by the optical path and the optical axis, the effect of attempting to miniaturize the device by inserting the reflector remains limited.

In contrast, in a case where the reflector is a concave surface, as it can operate on the angle formed by the optical path and the optical axis in addition to bending the optical axis itself, greater downsizing of the device can be achieved in comparison with the case of the flat reflector.

In general, however, usage of concave mirrors may be accompanied by side effects including optical aberrations such as optical path blurring and geometric distortion peculiar to concave mirrors, such that new problems arise in which degradation of acquired images occurs.

In view of this, the present invention aims to provide a compact and highly accurate device for optically detecting contamination of foreign materials deviating from predetermined criteria included in target objects by reliably acquiring optical information for the target objects from a near distance and comparing it with the predetermined criteria.

Solution to Problem

In order to achieve the above goals, the present invention relates to a device in which a lens is arranged to be faced to an offset concaved mirror which is an element of an optical unit for acquiring optical information for a target object, and the optical unit is configured to conform a first optical path associated with a first ray to a second optical path associated with a second ray to determine a direction of a chief ray propagating toward the offset concaved mirror from the each of object points, wherein the first ray passes a center of entrance pupil of the lens as a chief ray after beams propagated from any object points on the object surface is reflected by the offset concaved mirror, and the first optical path is a segmented path of the first ray from a reflection point on a surface of the offset concaved mirror to the entrance pupil of the lens, and wherein the second ray is included in a beam propagated from a conjugated point corresponding to the center of entrance pupil, and the second optical path is a path from the reflection point to the entrance pupil of the lens when the beam propagated from the conjugated point is reflected by the offset concaved mirror according to a local radius of curvature at the reflection point; and wherein the diameter of the entrance pupil is arranged to allow the relating marginal rays of the chief rays to pass through the entrance pupil, and the object is disposed where the conjugate point for an imaging point of the lens associated with the each chief ray corresponds to each object point on a surface of the object. Because of these features, by adjusting the conical constant (or eccentricity) of the offset concave mirror and selecting the surface shape of the offset concave mirror to be a quadric concave surface mirror, or in particular a spherical surface, an ellipsoid surface, a parabolic surface, or a hyperboloid surface, it is possible to control the inclination angle of the chief ray traveling from each object point to the concaved mirror with respect to the geometric symmetry axis (optical axis) of the concaved mirror to be parallel, diverging, or convergent.

Advantageous Effects of Invention

In the optical unit of the device according to the present invention, a lens is positioned to face an offset concaved mirror which allows a local radius of curvature to vary with any location or orientation on a surface of the offset concaved mirror, and as the entrance pupil of the lens is configured to be the exit pupil of the beam that reflects off the offset concaved mirror, each chief ray belonging to the beam emitted from each object point on the object plane of the target object toward the offset concaved mirror propagates along the optical path toward the entrance pupil position of the offset concaved mirror defined by the local surface shape of each reflection point on the offset concaved mirror, is reflected by the offset concaved mirror, and then proceeds toward the center of the entrance pupil of the lens.

Accordingly, solely by means of an offset concaved mirror in which only the offset portion for reflecting the beam from each object point on the object plane is cut out, an optical unit capable of efficiently gathering light from a target object into a small diameter lens may be used to realize reduced size and cost for the entire device without using a primary imaging optical system having a large opening diameter or alternatively arranging a lens at a position far away from the target object as seen in conventional sorting machines, with no occurrence of optical path interference between the diverging (propagating) light from within a wide field of view and the optical component.

In addition, in the device according to the present invention, at least one light path-bending mirror may be arranged between the offset concaved mirror and the lens, and the rays reflected by the offset concaved mirror may be bent in a predetermined direction. In particular, by using a plurality of light path-bending mirrors, the optical design is characterized by that the reflected rays are configured to be bent multiple times. As a result, the envelope size of the optical unit in the device may be reduced, which can contribute to further miniaturization of the entire device.

BRIEF DESCRIPTION OF DRAWINGS

FIGS. 5A to 5C are diagrams illustrating a state of reflection of light in a parabolic mirror.

FIGS. 10A and 10B are diagrams for explaining a geometric focus point on each conical surface.

DESCRIPTION OF EMBODIMENTS

Figure 1:
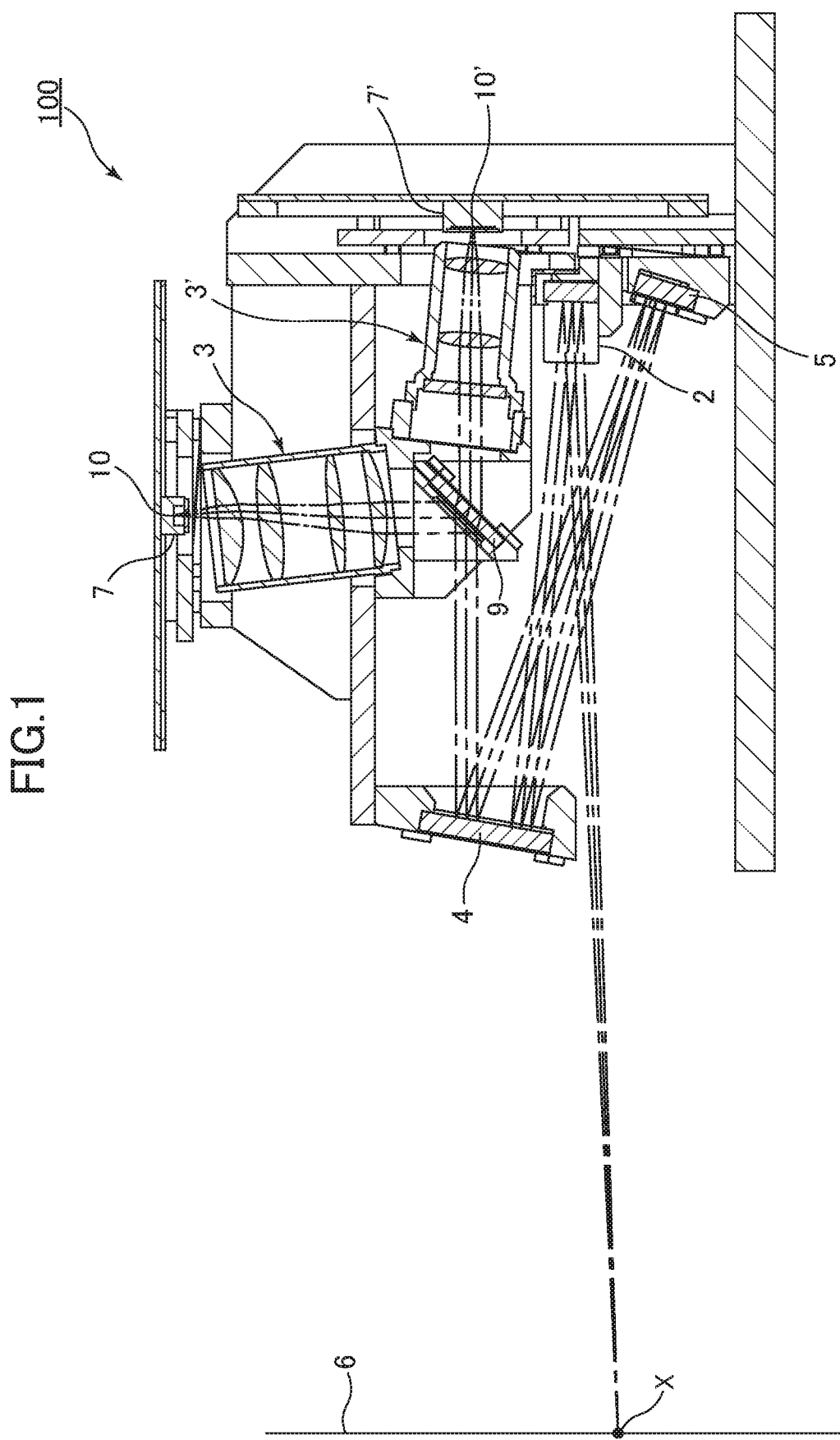
FIG. 1 is a schematic cross-sectional view illustrating an example of an optical unit of a device according to the present invention.

Hereinafter, an embodiment in which the device according to the present invention is applied to a sorting machine will be described with reference to the drawings. Herein, it is assumed that the target objects detected and selected by the sorting machine are rice grains, and optical information regarding the rice grains is obtained. As harvested rice may include foreign materials such as defective rice and rocks, it is necessary to remove them, and the sorting machine according to the present embodiment may separate rice within the criteria from rice over the criteria based on the acquired optical information.

Note that, as the present invention particularly relates to the optical unit 100 within the structure of the sorting machine, details of the configuration and functions of the sorting machine other than those of the optical unit will be omitted herein.

The concaved mirror included in the optical unit of the device according to the present invention does not necessarily require that the entire concaved mirror is defined as a single quadric concave surface mirror shape, and usage of conic curves that form concaved surfaces and arbitrary concaved mirrors whose radius of curvature varies according to the position or orientation on the surface are also possible. However, as will be described later, in the optical unit used in the first to third embodiments, the arbitrary concaved mirror is a quadric concave mirror, and cases will be described therein in which each of a parabola concave mirror type, an elliptical concave mirror type, and a hyperbolic concave mirror type are used.

First, the relationship between quadric concave surface mirrors and conic curves will be described. A conic curve is a general name for a group of curves obtained as contour shapes of a cross section when a cone is cut by an arbitrary plane. These conical curves can be classified as circles, ellipses, parabolas, and hyperbolas, and as illustrated in FIGS. 9A to 9D, the profile of a cross section cut along a plane perpendicular (with an inclination angle of 90°) to the axis of the cone may be a circle as in FIG. 9A, the profile of a cross section cut along a plane with an inclination angle larger than the half-apex angle of the cone may be an ellipse as in FIG. 9B, the profile of a cross section cut along a plane with an inclination angle parallel to the semi-apex angle of the cone (that is, a plane parallel to the generating line) may be a parabola as in FIG. 9C, and the profile of a cross-section cut along a plane with an inclination angle smaller than the half-apex angle of the cone may be a hyperbolic curve as in FIG. 9D.

These circles, ellipses, parabolas, and hyperbolas are quadratic curves, and each of them has two singularities called Euclidean geometric focal points $f_1$ and $f_2$. In particular, the two independent focal points of the "ellipse" exist inside a closed space surrounded by the curve (FIG. 10A). The "circle" is a special ellipse, where the two focal points $f_1$ and $f_2$ share the same point, such that it appears that only one focal point (that is, the center of the circle) is present. The "parabola" is an ellipse in which one of the two focal points exists at infinity. The "hyperbola" is an ellipse in which one of the two focal points $f_1$ exists outside the closed space surrounded by the curve (FIG. 10B). Spherical, ellipsoidal, parabolic, and hyperboloidal surfaces are formed when the contour shapes are rotated around the axis connecting the two focal points of these quadratic curves, and when viewed from the inside of each surface, they become spherical concave surfaces, elliptical concave surfaces, parabolic concave surfaces, and hyperbolic concave surfaces which belong to the quadric concave surface.

For example, when looking at the elliptical curve in FIG. 10A, the sum of the lengths of straight lines going from one focal point $f_1$ to the other focal point $f_2$ via one point (P) on the elliptic curve become a constant value ($f_1P+f_2P$) regardless of which point P is selected on the elliptic curve.

When such geometrical context is considered in association with optical phenomena, it can be understood that when a ray emerging from one focal point $f_1$ is reflected at an arbitrary point P of the quadric concave surface, it reliably reaches the other focal point $f_2$ without aberration. This remains true even in a case where the exit side focal point is replaced with the entrance side focal point. The two focal points $f_1$ and $f_2$ of the quadric concave surface mirror are commutative, and are in a conjugate relationship.

Note, however, that the focal points $f_1$ and $f_2$ of the quadric concave surface described above are geometric focal points, and do not necessarily coincide with the optical focal points. When one of the geometric focal points $f_1$ is associated with the "object point", which is the starting point of the ray based on the optical definition, the other geometric focal point $f_2$ is only associated with an "image point" according to the optical definition. That is, it does not indicate a "focal point" according to the optical definition. A "focal point" according to the optical definition is a point such that, when a paraxial beam parallel to the geometric symmetry axis of the quadric concave surface is incident, the beam converges after being reflected by the quadric concave surface. Here, the beam from the object point being parallel to the geometric axis of symmetry of the quadric concave surface corresponds to the case where the object point is placed at infinity, it becomes clear that only the concave paraboloid of the quadric concave surface has the focal point $f_1$ as the object point. Accordingly, in this case, the image point coincides with the geometric focal point $f_2$.

In contrast, in the case that the quadric concave surface is a spherical surface, then the two focal points described above coincide, and when an object point is placed at one focal point $f_1$ existing at the center of the sphere, the other geometric focal point $f_2$ existing at the center of the sphere also corresponds with the image point. Therefore, inevitably, the object point is placed at infinity; that is, when rays incident on the spherical surface from the object point are a parallel bundle, the reflected light from the spherical surface is no longer gathered at the geometric focal point $f_2$, and the reflected light is instead directed to a position closer to the spherical surface than the geometric focal point $f_2$. That is, the focal point position according to the optical definition no longer coincides with the geometric focal point $f_2$.

As the surface shape of well-known parabola antennas coincides with a paraboloid defined as a curved surface obtained by rotating a parabola around its geometric axis of symmetry, parabolic concave mirrors having parabolic concave shapes are also called parabolic concave mirrors. An optical unit using a parabolic concave mirror (strictly speaking, an "offset parabolic concave mirror" where the parabolic concave mirror has been offset) having this special parabolic surface where the optical focal point and the geometric focal point coincide will be described as the first embodiment.

First Embodiment

Figure 3:
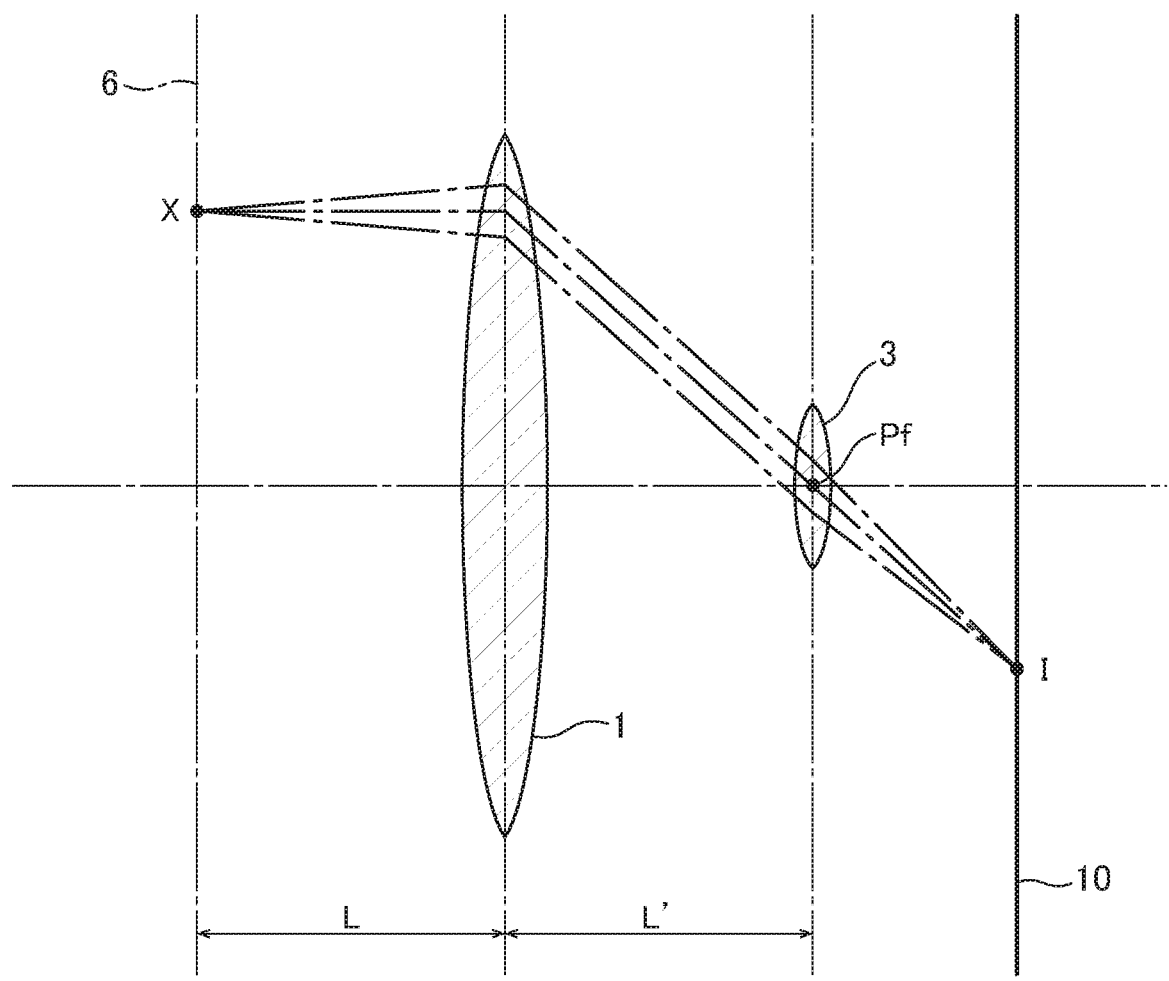
FIG. 3 is a diagram illustrating an optical principle when the present invention is realized by a convex lens.

In order to describe the optical unit 100 of the sorting machine in the first embodiment, the concept of an object-side telecentric optical system will first be explained.
(1) Object-Side Telecentric Optical System As illustrated in FIG. 3, rays incident parallel to the optical axis of the lens 1 naturally intersect the optical axis at the focal point position $P_f$ on the exit side of the lens 1. Due to this property, in a case where an aperture is placed at the focal point position $P_f$ a ray (chief ray) passing through the center of the aperture will travel parallel to the optical axis of the lens 1 before reaching the lens 1. Accordingly, what is known as an object-side telecentric optical system is formed.

Figure 4:
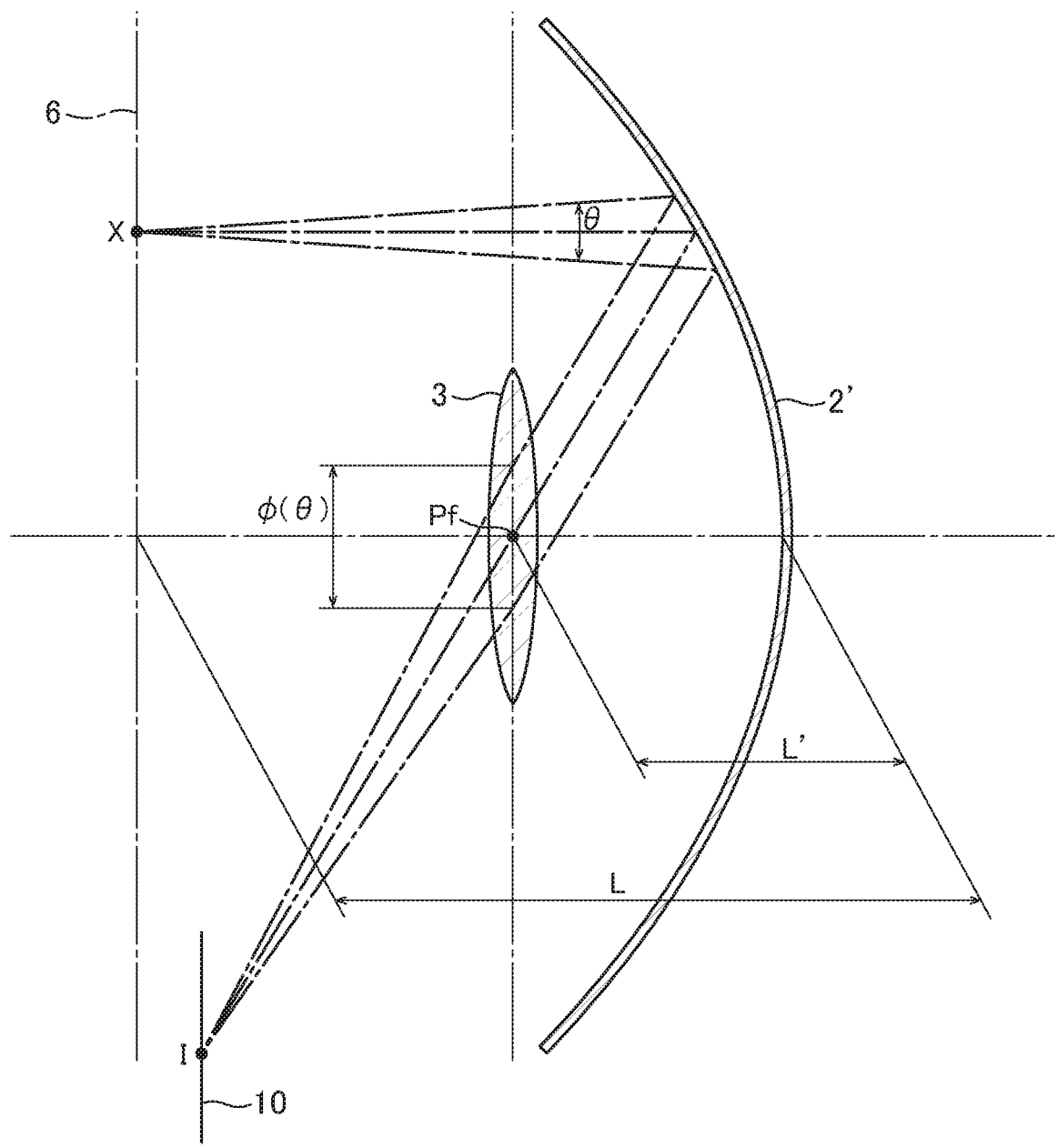
FIG. 4 is a diagram illustrating an optical principle when the present invention is realized by a parabolic mirror.

In FIG. 3, the principle of the telecentric optical system has been described using the convex lens 1, but FIG. 4 illustrates this principle using a reflecting mirror. The symbol 2' is a parabolic concave mirror, and the symbol 6 is the object plane on the surface of the target object. Among the rays radiated from each point of the target object X, when a group of parallel rays parallel to the optical axis (geometric axis of symmetry) of the parabolic concave mirror 2' are reflected by the parabolic concave mirror 2', the group of parallel rays proceed to intersect with each other at the focal point $P_f$ of the parabolic concave mirror due to the optical characteristics of the parabolic concave mirror. Due to this property, in a case where an aperture is placed at the focal point position $P_f$ a ray (chief ray) passing through the center of the aperture will travel in parallel to the optical axis of the parabolic concave mirror before reaching the parabolic concave mirror. That is, an object-side telecentric optical system is formed.

When the aperture above the focal point position $P_f$ is used as the exit pupil of the quadric concave surface mirror that reflects the diverging beam from each object point on the object plane, in the case where the pupil shape is circular, for example, the diverging light from each object point becomes a diverging beam having a conical shape (with a divergence angle θ) with each chief ray as an axis, and reaches the parabolic concave mirror 2. At that time, the entrance pupil for the parabolic concave mirror is formed at infinity. This principle can be directly associated with the optical principle already described in terms of the relationship between 'the entrance pupil and the exit pupil of the quadric concave surface mirror that reflects the diverging beam from each object point on the object plane' and 'the geometric focal point position'. In addition, when the object plane 6 orthogonal to the optical axis of the parabolic concave mirror 2' in the cross section depicted in FIG. 4 includes the optical focal point of the parabolic concave mirror 2' (such that the object distance L and the focal length f coincide), the diverging beam bundle having the conical shape (with the divergence angle θ) with the group of parallel rays parallel to the optical axis of the parabolic concave mirror 2' being its axis travels as a parallel beam along the reflected chief ray after being reflected by the parabolic concave mirror 2' until it reaches the lens 3.

After reflecting the light from the target object with the parabolic concave mirror, the optical unit 100 of the present embodiment is configured to guide the light to the photodetector using the lens. Each chief ray diverging from each object point on the object plane of the target object and passing through the center of the entrance pupil of the lens after being reflected by the parabola concave mirror travels in parallel to the geometric axis of symmetry of the parabolic concave mirror. The entrance pupil of the group of rays heading to the parabolic concave mirror is placed at infinity.

Figure 11:
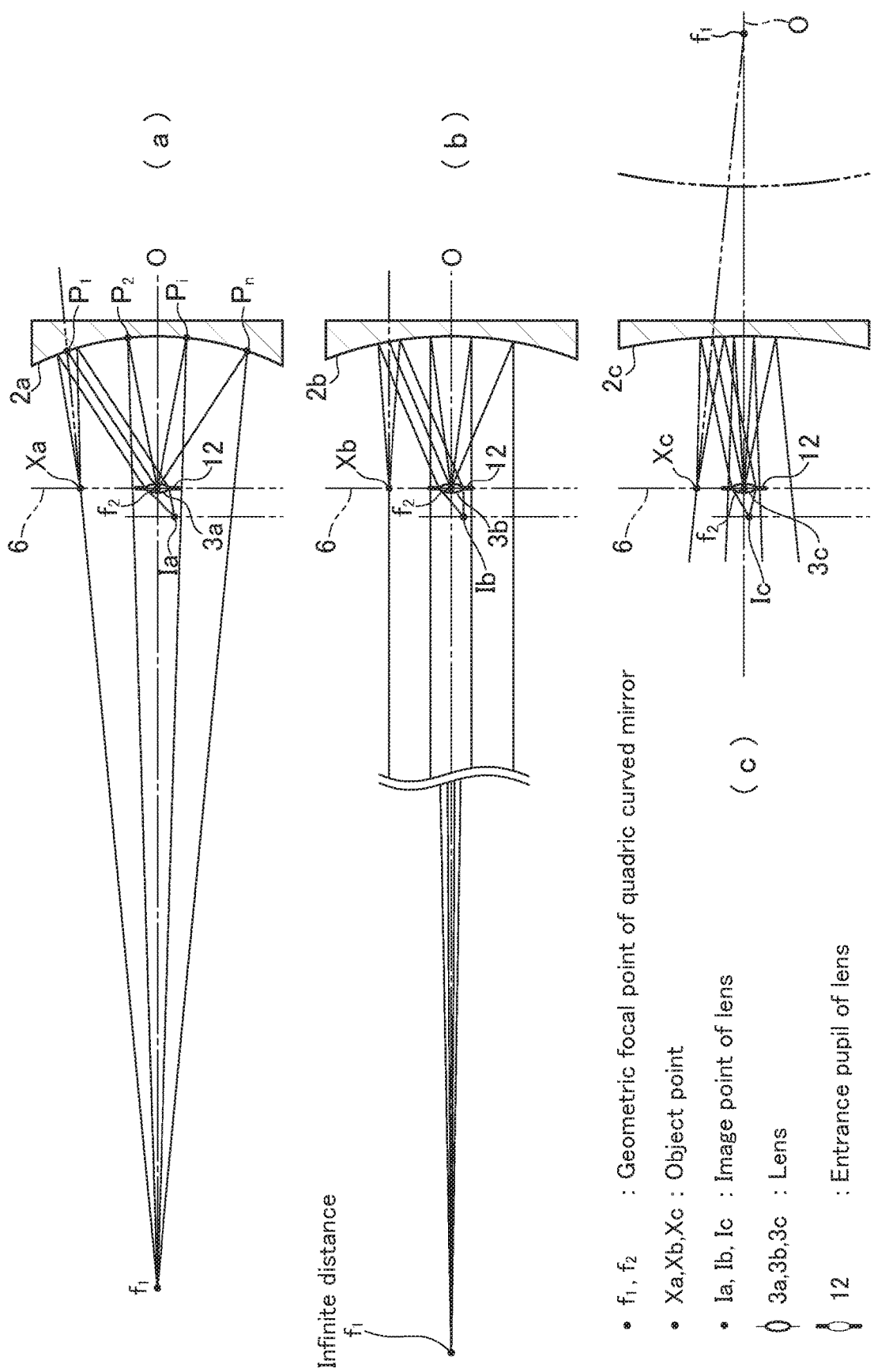
FIGS. 11A to 11C are diagrams illustrating an optical path in each quadric concave surface mirror.

In particular, as illustrated in FIG. 11B, the diverging beam from each object point $X_b$ on the object plane is reflected by the parabolic concave mirror 2b and travels toward the lens 3b having the entrance pupil at the position of the geometric focal point $f_2$ of the parabola concave mirror 2b. The beam that reaches the lens 3b is thereafter gathered at the image point $I_b$ of the lens 3b. At this time, particularly in the case where the object distance coincides with the focal length according to the optical definition of the parabolic surface of the parabolic concave mirror 2b, the beams reflected by the parabolic concave mirror 2b and traveling toward the lens 3b become a parallel bundle.

As described above, as each ray incident on the parabolic concave mirror passes through the geometric and optical focal points of the parabolic concave mirror in parallel with the geometric axis of symmetry of the parabolic concave mirror, in a case where a lens 3 having an entrance pupil at this focal point position is arranged and a ray passing through the center of the entrance pupil after being reflected by the parabolic concave mirror 2' is taken as the chief ray, this is equivalent to using a ray as the chief ray, in which the ray is emitted from each point on the object plane perpendicular to the geometric axis of symmetry of the parabolic concave mirror and emerging in the orthogonal direction of the object plane. After being reflected by the parabolic concave mirror 2', considering that the beam passing through the lens 3 emerges from each object point on the object plane 6 of the target object X while exhibiting a conical divergence (with a divergence angle θ) around the chief ray, it can be easily understood that the properties of the optical unit 100 using the parabolic concave mirror are such that a direct downward view may be achieved of the object plane 6 of the target object (that is, images can be captured from a direction orthogonal to or nearly orthogonal to the object plane). Refractive lenses with large openings are expensive, and in a case where an optical unit 100 using such a lens were to be incorporated in a sorting machine, this may lead to a significant increase in the manufacturing cost of the sorting machine. In the present embodiment, however, by using a relatively low-cost parabolic concave mirror (in practice, an offset parabolic concave mirror to be described later) which can guarantee a wide-field of view in place of an expensive lens, it is possible to acquire optical information for a target object while significantly reducing the manufacturing cost of the sorting machine.

Note that, as long as the optical unit 100 of the present embodiment is based on the optical principle of the object-side telecentric optical system, it can be assumed that the chief ray group parallel to the geometric axis of symmetry of the parabolic concave mirror 2' is incident on the parabolic concave mirror. Note, however, that even in a case where the chief ray incident on the parabolic concave mirror is not perfectly parallel to the optical axis of the parabolic concave mirror, it will not become impossible to immediately perform the direct downward view with respect to the object plane of the target object X. In a case where an arbitrary ray included in the diverging beam from the target object that passes through the entrance pupil of the focusing lens 3 after being reflected by the parabolic concave mirror 2' travels toward the parabolic concave mirror along the normal at the object point on the object plane of the target object X orthogonal to the geometric axis of symmetry of the parabolic concave mirror, it can be understood that the optical unit 100 equipped with the parabolic concave mirror retains the property of allowing a direct downward view of the object plane 6 of the target object X even though the ray is not the chief ray. The need to replace these chief rays particularly arises in cases such as when the arranged position of the entrance pupil determined by the focusing lens 3 is not arranged so as to strictly coincide with the geometric focal point position of the parabolic concave mirror 2' and also when the parabolic concave mirror 2' is not formed as a strict mathematical or geometric parabolic surface. The optical unit 100 equipped with the parabolic concave mirror (in practice, an offset parabolic concave mirror to be described later) includes cases in which replacement of the chief rays occurs in consideration of this necessity, and does not strictly require the condition that the "chief ray" incident on the parabolic concave mirror be completely parallel to the optical axis of the parabolic concave mirror.

(2) Offset Parabolic Concave Mirror

Figure 13:
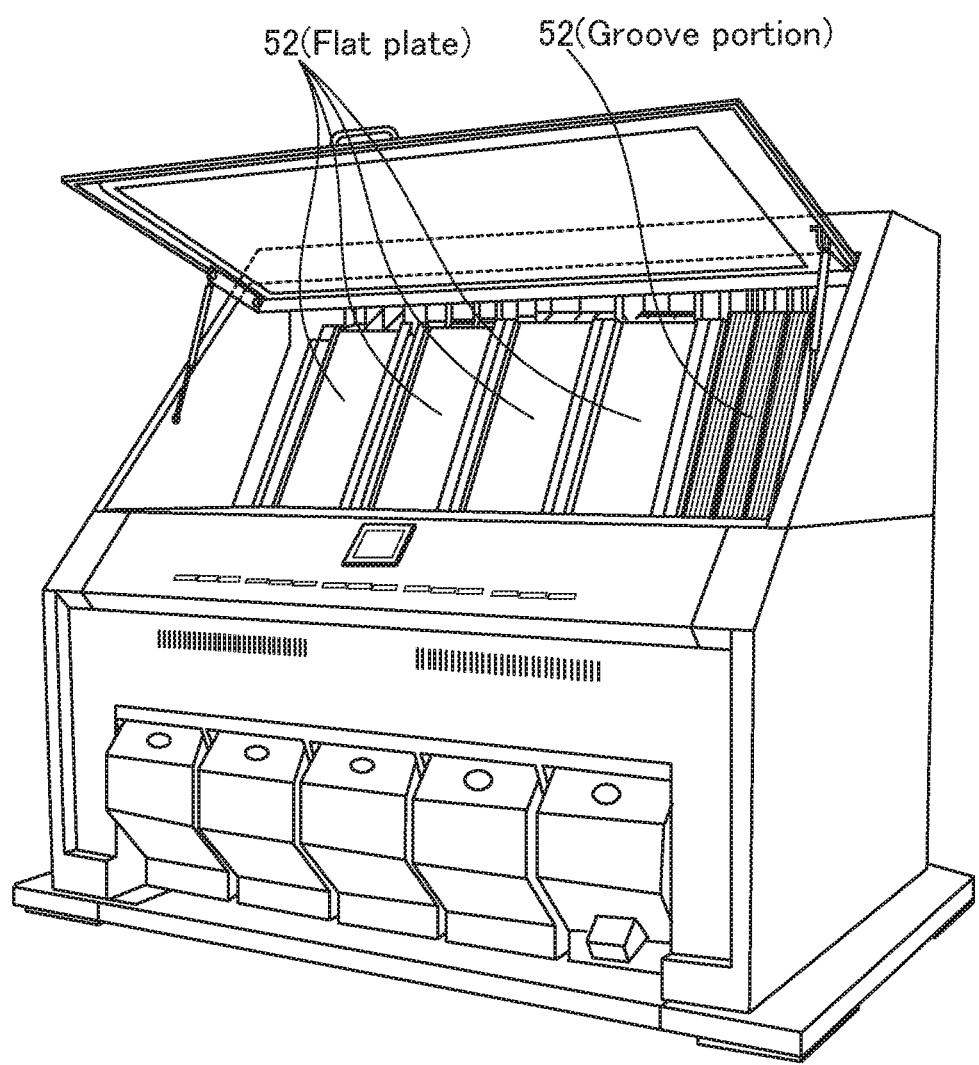
FIG. 13 is a diagram illustrating an example of an outward appearance configuration of a known conventional sorting machine.
Figure 14:
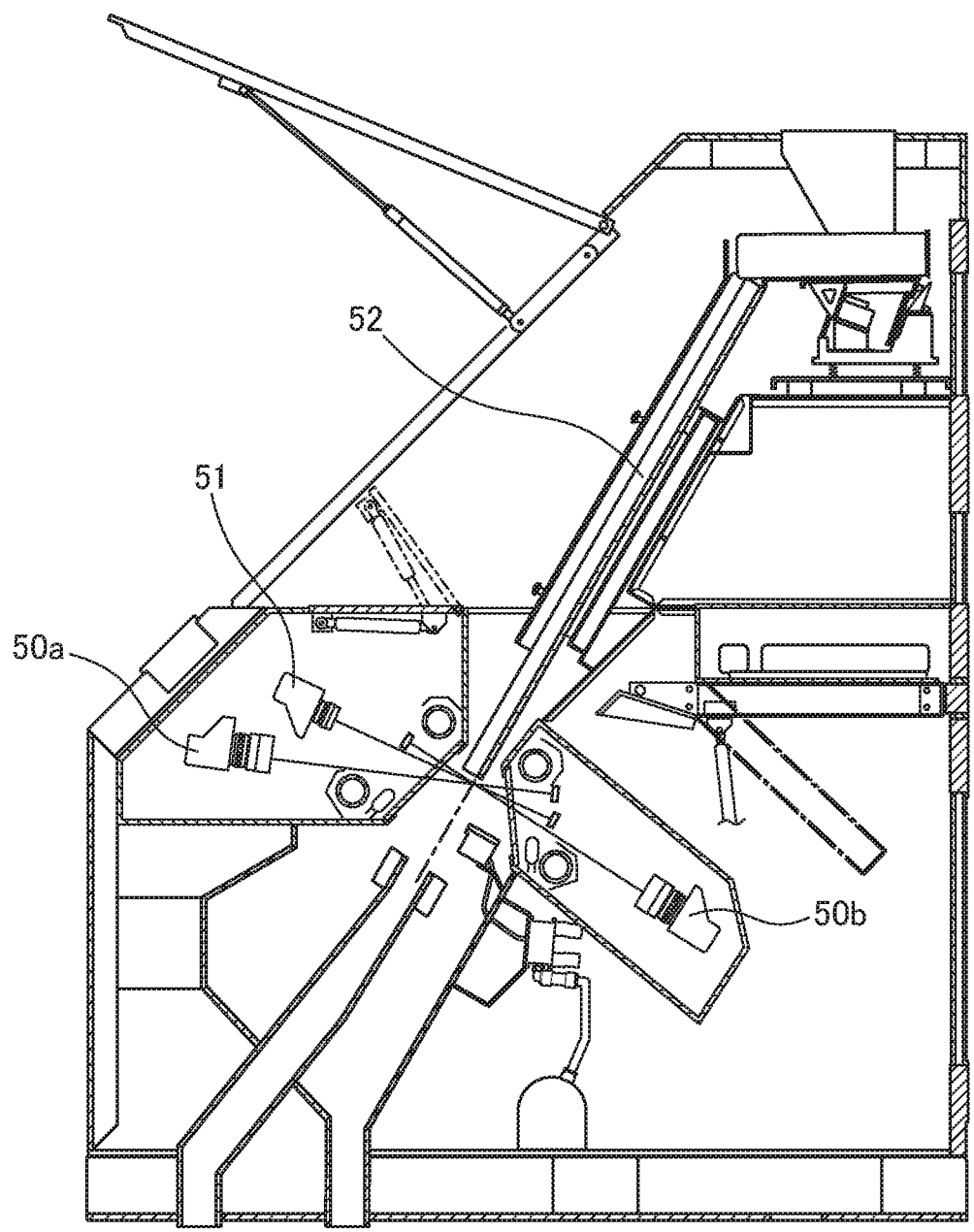
FIG. 14 is a cross-sectional view of the sorting machine depicted in FIG. 13.

FIG. 1 is a schematic cross-sectional view of an optical unit 100 used in the sorting machine according to the present embodiment, and illustrates an example of an optical unit incorporating an offset parabolic concave mirror 2. As illustrated in FIG. 13 and FIG. 14, in order to detect a large number of rice grains with the optical unit 100, rice grains are poured into a guide plane with a fixed width, referred to as a chute 52, and the grains are dropped at once from above position of the sorting machine.

Figure 2:
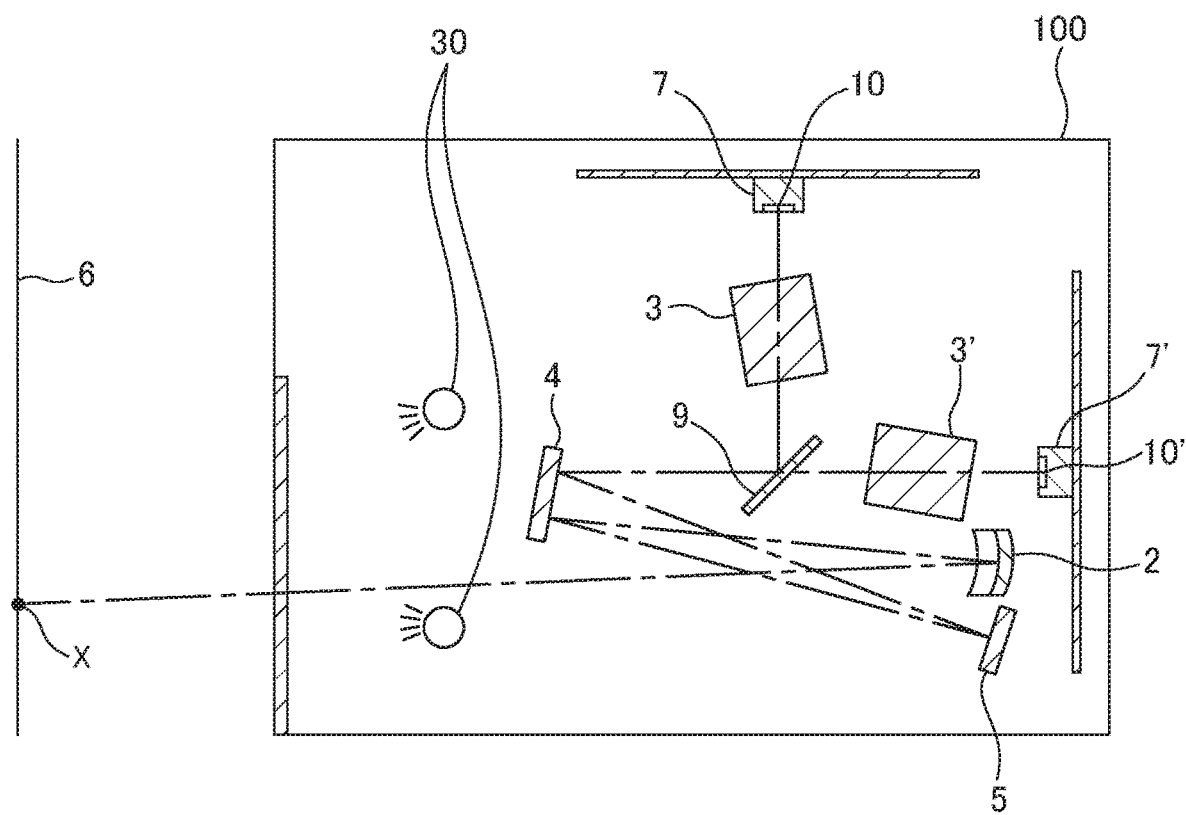
FIG. 2 is a schematic cross-sectional view of when an optical unit and illumination means are housed in a casing.

FIG. 2 is a schematic cross-sectional view of when the optical unit 100 and the illumination means 30 are housed in a casing. In the optical unit 100, in addition to autofluorescent target objects, in the case of non-autofluorescent target objects, by irradiating the target object with light from the illumination means 30 in the sorting machine, the target object itself can be regarded as a light source. As such, when the rice grains poured into the chute fall from above position, the group of rays emitted from each object point on the object plane of the target object X are reflected by the offset parabolic concave mirror 2.

Note that one optical unit 100 detects light that is incident toward the offset parabolic concave mirror 2 from one side half of a rice grain, and diverging light from the opposite half of the rice grain is detected by the same detection principle using a paired optical unit having the same structure.

Figure 6:
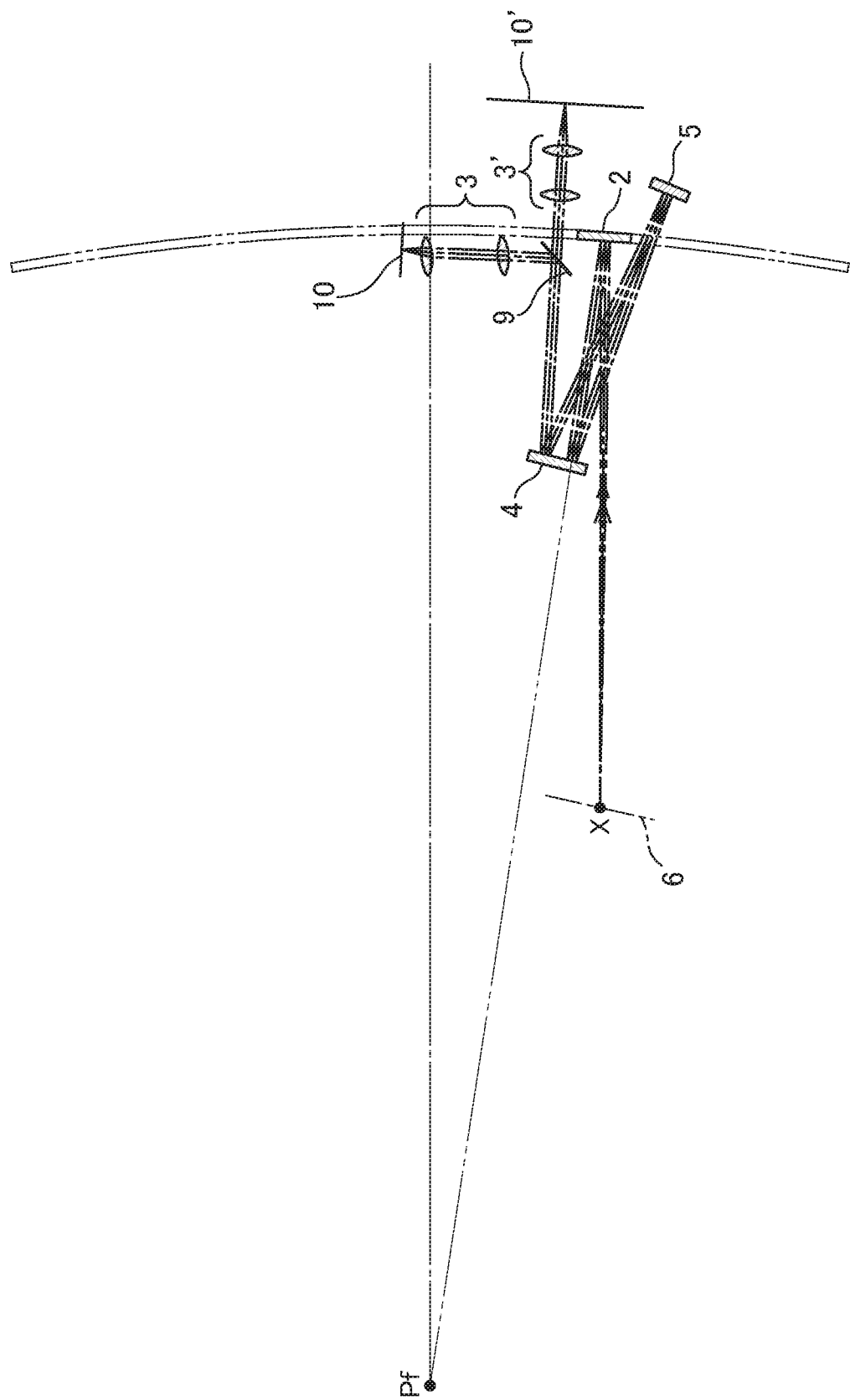
FIG. 6 is a diagram for explaining an optical path of diverging light from a target object.
Figure 7:
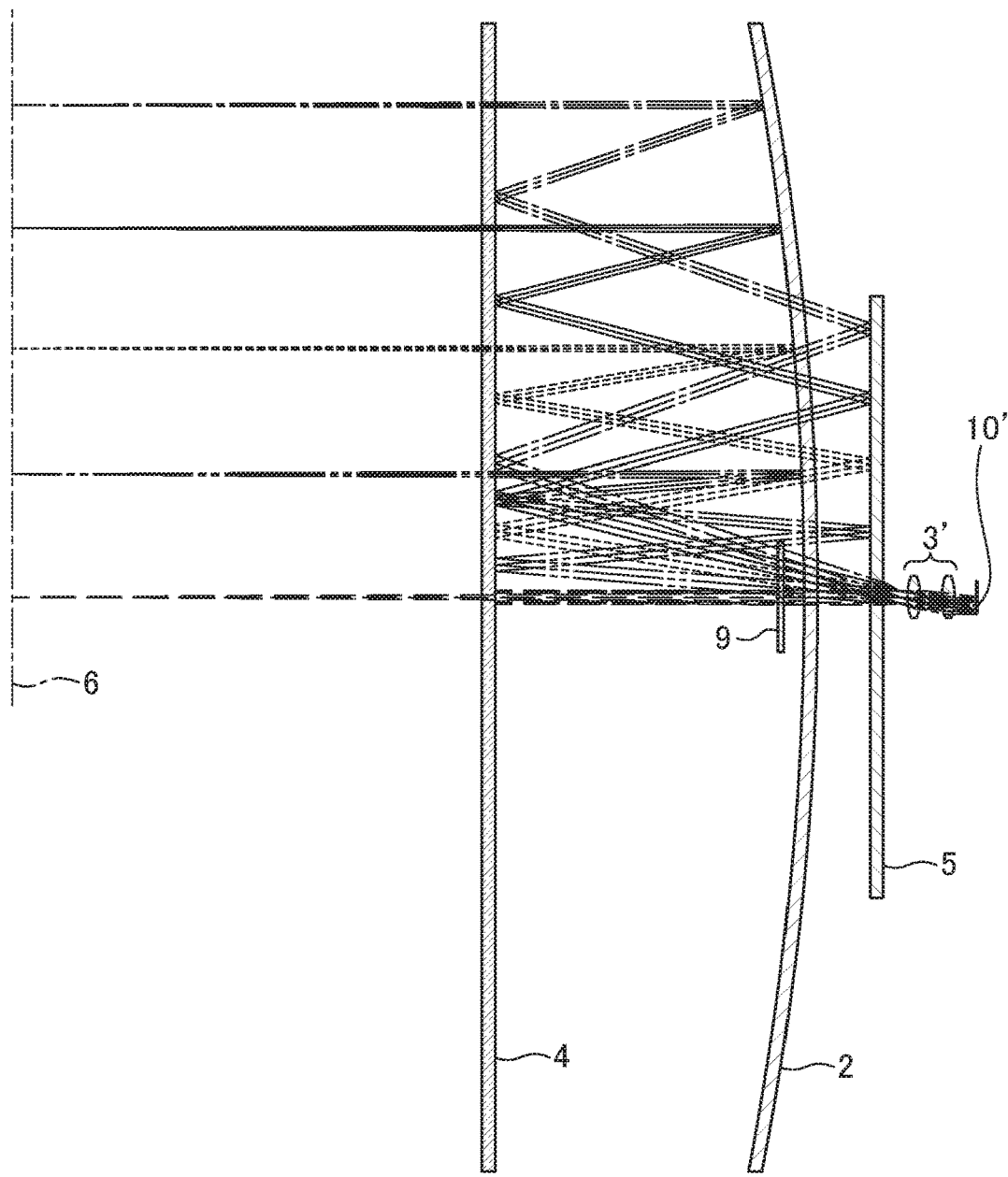
FIG. 7 is a diagram illustrating how an optical path bends when rays from a plurality of target objects arranged on a straight line are incident.

As described above, the optical unit 100 of the present embodiment utilizes an offset parabolic concave mirror 2 having a partial parabolic surface offset from the optical axis of the parabolic surface of the parabolic concave mirror as illustrated in FIG. 5. FIG. 7 is a top view of the parabolic concave mirror 2 illustrated in FIG. 6, in which incident light enters toward the parabolic concave mirror 2 and is reflected. Although the repeated reflection of the light will be described later, as illustrated in FIG. 7, the lengthwise direction of the offset parabolic concave mirror 2 (the vertical direction in FIG. 7) is a parabolic surface having a width of, for example, several tens of centimeters in accordance with the width of the chute. In this way, the offset parabolic concave mirror 2 arranged in the optical unit 100 of the first embodiment is formed with a narrowed width in the vertical direction of the entire paraboloid, such that diverging light from a plurality of falling rice grains can be collectively reflected after sliding down the chute.

As described above, one feature of this optical unit 100 is that it uses an offset parabolic concave mirror 2, which is a partial parabolic surface offset from the optical axis of the parabolic concave mirror 2'. As such, incident light is reflected by a paraboloid that does not include a geometric axis of symmetry (optical axis) at the center of the parabolic concave mirror. Supposing that the chief ray group from the object is arranged in a plane including the optical axis of the parabolic concave mirror by using an ordinary parabolic concave mirror 2' in which the parabolic surface of the parabolic concave mirror is symmetrical with the optical axis interposed there between, as in Patent Document 2, the lens 3 arranged at the focal point position of the parabolic concave mirror 2 blocks the progression of the light from the object point of the rice grain that would be incident on the parabolic concave mirror 2 (see FIG. 5A). In contrast, this issue can be avoided in cases where the offset parabolic concave mirror 2 is utilized. That is, as illustrated in FIG. 5B, when diverging light from the rice grains is reflected by the offset parabolic concave mirror 2, the focal point position of the offset parabolic concave mirror at which the reflected light of the chief ray group gathers exists at a position that does not interfere with the optical path from the target object X to the offset parabolic concave mirror 2. Accordingly, as the lens 3 having the entrance pupil at the focal point position of the offset parabolic concave mirror 2 is not present within or on the line of the optical path of the light to be incident on the offset parabolic concave mirror 2, it is possible to reliably detect the light from the rice grains. This is because the present invention differs from the arrangement illustrated in FIG. 15 and FIG. 16 of Patent Document 2 described above in which incident light traveling from behind the second reflector portions 11, 11A toward the first reflector portions 10, 10A from an object is blocked by the second reflector portions 11, 11A and the light receiving means 5.

Note that, instead of using the offset parabolic concave mirror 2 illustrated in FIG. 5B, in a case where the ordinary parabolic concave mirror 2' illustrated in FIG. 5A is tilted in an attempt to achieve the same function as the offset parabolic concave mirror 2, the chief ray group from the rice grains corresponds to light incident at an incident angle θ that is not parallel to the optical axis from the viewpoint of the parabolic concave mirror 2" after being tilted (see FIG. 5C).

As the aberration generated thereby reduces the concentrated at the same point of the chief ray group, even in a case where the lens 3 is arranged at the concentrated position of the reflected light, aberration propagates to the quadric image plane of the photodetector and image deterioration such as blurring occurs, such that it becomes impossible to detect high definition optical information from the rice grains. In order to avoid this, the optical unit 100 according to the present embodiment has a configuration such that light detection is performed by a lens 3 arranged at the focal point position after a group of chief rays traveling toward the offset parabolic concave mirror 2 which is not an ordinary parabolic concave mirror 2 and parallel to the optical axis.

(3) Bending of the Optical Path

As described above, one of the purposes to be solved of the present invention is to achieve size reduction of the device, and for this purpose, it is necessary to reduce the size of the incorporated optical unit 100 as much as possible. Accordingly, as illustrated in FIG. 1, measures are taken to reduce the size of the optical unit by bending the optical path partway along. FIG. 6 and FIG. 7 illustrate bending of the optical path by the optical unit 100. After a diverging beam with each point on the rice grain as an object point is reflected by the offset parabolic concave mirror 2, prior to reaching the focal point position of the offset parabolic concave mirror 2 where the chief rays belonging to each beam intersect with each other, the reflecting mirror 4 returns the optical path to the offset parabolic concave mirror such that it faces the reflecting mirror 5. The reflecting mirror 5 once again reflects the returned group of rays toward the reflecting mirror 4. In particular, the mirror that receives the group of rays at this time is the same reflecting mirror 4 that received the light reflected by the offset parabolic concave mirror 2, and the reflecting mirror 4 performs this second reflection. Subsequently, the group of rays goes to the lens 3' and forms an image on the image forming surface 10' behind the lens 3' to detect the rice grains. Note that in the optical unit 100 of the present embodiment, after the reflecting mirror 4 performs the second reflection, in order that light is directed to both the near infrared ray image sensor 7' placed in the rear imaging plane 10' and the visible image sensor 7 placed on the imaging plane 10, a dichroic mirror 9 is used as an optical path branching element. The optical path length up to the lens 3 after being reflected by the offset parabolic concave mirror 2 corresponds to the total optical path length obtained by summing the plurality of bent optical paths. In addition to splitting the optical path based on the wavelength of the group of rays, optical path branching elements 9 such as the dichroic mirror 9 can also be used to enable a plurality of image sensors to process each of their respective regions with a wide field of view with respect to the plurality of falling rice grains. Further, instead of processing a wide field of view with a uniform resolution, for example, the optical path of a specific group of rays may be controlled by the optical path branching element so as to provide variation in the spatial resolution of the observed target region such that the center of the field of view becomes a high-resolution detection region.

As described above, in the case of the present embodiment, in a case where reflection by the dichroic mirror 9 is excluded, a total of four reflections (including reflections by the offset parabolic concave mirror 2) are performed. At this time, the size and inclination angle of the mirror surfaces may be adjusted such that one reflecting mirror 4 forms two reflections based on the detailed design of the optical path. By bending the optical path a plurality of times, it becomes possible to place the lens 3 at a position as close as possible to the offset parabolic concave mirror 2 while maintaining correspondence to the optical path up to the lens 3 after reflection by the offset parabolic concave mirror 2. Accordingly, the optical units 100 of sorting machines to which the device of the present invention is applied can be significantly reduced in size in comparison with known techniques, the number of reflecting mirrors to be used can be successfully decreased, and an effect of reducing the manufacturing cost of the sorting machine while compactly suppressing the total length of the light rays may be achieved.

Note that the optical path need not necessarily be bent, and it is not necessary that the total number of reflections be four times as in the present embodiment. Further, cases in which reflection by the reflecting mirror 4 is performed only one time, or alternatively three or more times are also included. Decisions of whether to bend the optical path and the number of times it should be bent may be appropriately made based on the size of the sorting machine or the optical unit, the position where the lens is arranged, and the like.

In addition, when the optical unit 100 is actually mounted in a device such as a sorting machine or the like, it is not necessarily required that the object plane 6 be located at the focal point position f of the offset parabolic concave mirror 2 (e.g., that the object distance L and the focal length f coincide). For the purpose of miniaturizing the sorting machine, that is, achieving compactness of the optical unit 100, it is possible to have the object plane 6 closer to the offset parabolic concave mirror than the focal position f. As the object plane 6 approaches the offset parabolic concave mirror 2, the group of rays reflected from the offset parabolic concave mirror 2 do not become parallel and the divergence angle becomes large, but this may be mitigated or solved by increasing the size of the entrance pupil of the lens used as the lens 3. Further, blurring and distortion of images caused by the fact that the group of rays reflected by the offset parabolic concave mirror 2 are not parallel may be mitigated or solved by performing aberration correction with the lens 3. Similarly, due to the positional relationship with various components included in the optical unit 100, the object distance L may be a distance greater than the focal length f of the offset parabolic concave mirror 2. In this case as well, aberration resulting from the fact that the group of rays reflected by the offset parabolic concave mirror 2 were not parallel can be corrected by the lens 3.

(4) Condensed Image Distortion Correction

Figure 8:
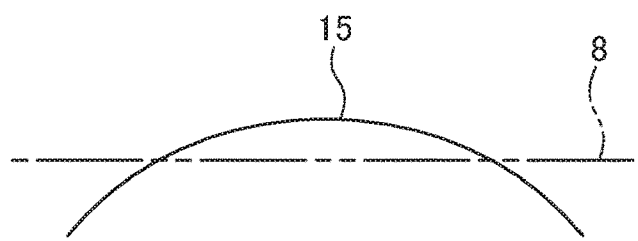
FIG. 8 is a diagram illustrating that a condensed image by a lens is distorted.
Figure 9:
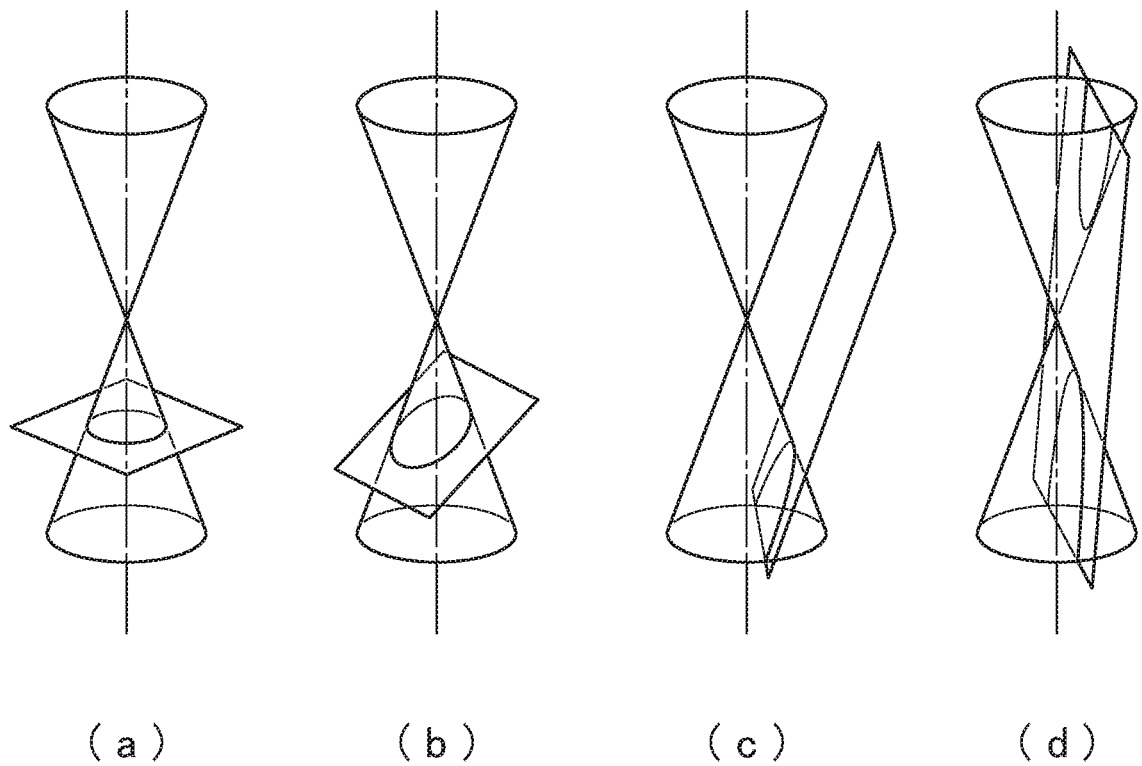
FIGS. 9A to 9D are diagrams for explaining types of quadric concave surface mirrors.

The light reflected by the offset parabolic concave mirror 2 may be refracted a plurality of times such that the optical image formed on the imaging plane by the lens 3 is clear and free of blurring. However, as an offset parabolic concave mirror 2 is used in place of an ordinary parabolic concave mirror 2', it is inevitable that a distorted image is detected due to the influence of the offset. In a case where the visible image sensor 7 is a one-dimensional line sensor, the optical image corresponding to a linear light receiving element array of the light receiving element sensor is distorted as illustrated in FIG. 8, and it is impossible to capture the entire linear object as an instantaneous image.

Accordingly, it is necessary to correct this distorted deformation. Therefore, in the optical unit 100 of the present embodiment, the distortion of the detected image is resolved by tilting the optical axis of the lens 3. That is, by tilting the optical axis of the lens 3 so that the incident light from the offset parabolic concave mirror incident on the lens 3 is obliquely incident on the optical axis of the lens 3, the same amount of distortion was generated in the lens 3 in a direction opposite to that generated by the offset parabolic concave mirror. As a result, the distortion of the detected image is canceled out, and it is possible to detect the entire linear object as an instantaneous field of view even in the case where the near infrared ray image sensor 7' and the visible image sensor 7 are arranged in a linear light receiving element array.

In addition, the degree of distortion described above can vary depending on manufacturing errors and the like. In addition to elimination by a method of tilting the optical axis itself of the lens 3, this variation can be compensated for by changing the inclination angle of the chief ray with respect to the lens 3 by adjusting the inclination angle of the reflecting mirrors 4 and 5.

By highly restricting both the radius of curvature of the reflecting surface of the utilized offset parabolic concave mirror 2 and the allowable error amount of the conic constant, a surface shape that can be considered to sufficiently coincide with an ideal parabolic surface may be realized. Further, in a case where accuracy is ensured when cutting the offset to the required size and assembly error with respect to the optical unit 100 is also minimized, a chief ray corresponding to each object point on the surface of the rice grain constitutes a telecentric ray with sufficient accuracy.

In reality, however, making a concave curved surface into an ideal parabolic mirror and maintaining cutting errors and assembly errors as close to zero as possible can not only result in extremely high manufacturing costs, but also be associated with technical manufacturing difficulties. Accordingly, in an imperfect optical system that is merely assembled with a concave mirror manufactured with realistic precision, the group of chief rays traveling from the object point to the concave mirror are not necessarily a telecentric ray group.

In such a case, in order to compensate for the break-down of the ideal geometric relationship between the offset parabolic surface and the entrance pupil surface of the lens, it is desirable to compensate for imperfections in manufacturing the optical system by adjusting the arrangement angles of the plurality of reflecting mirrors 4 and 5 such that the chief ray can be sufficiently regarded as a telecentric ray.

When optical information for each rice grain is acquired by the above-described optical unit 100, the sorting machine may compare it with predetermined criteria and determine whether it is foreign materials or outside the criteria. Then, by sorting means (not illustrated) that utilizes the force of air ejected from an ejector nozzle, rice grains that are determined to be foreign materials or outside the criteria are blown away and conveyed to a storage tank separate from the storage tank in which the rice grains that are within the criteria fall and are stored.

Second Embodiment

Next, an optical unit will be described that uses an offset elliptical concave mirror in place of the offset parabolic concave mirror used in the first embodiment.

As the technical significance of the "offset" used by the offset parabolic concave mirror, the operational effect of bending the optical path using at least one reflective mirror, and the method of correcting the distortion of the condensed image described in the first embodiment similarly apply to the second embodiment, the repeated description thereof will be omitted herein (this also applies to the third embodiment and the fourth embodiment to be described later).

As illustrated in FIG. 11A, in the case of the second embodiment, as an offset elliptical concave mirror $2a$ obtained by offsetting an ordinary elliptical concave mirror is utilized, the fact that the group of chief rays emitted from each object point Xa on the object plane are diverging with respect to the geometric symmetry axis (that is, the optical axis) of the offset elliptical concave mirror differs from the group of chief rays of the first embodiment that are parallel with respect to the optical axis of the offset parabolic concave mirror.

The reason that the group of chief rays traveling from each object point Xa on the object plane to the offset elliptical concave mirror $2a$ exhibit divergence with respect to the optical axis O of the offset elliptical concave mirror $2a$ is as follows.

This optical unit in which a lens $3a$ having an entrance pupil arranged at one geometric focal point $f_2$ of the offset elliptical concave mirror $2a$ so as to face the offset elliptical concave mirror $2a$ functions as an optical system in which the exit pupil for the group of chief rays reflected from the offset elliptical concave mirror $2a$ is arranged at the geometric focal point $f_2$. Accordingly, the other geometric focal point $f_1$ of the offset elliptical concave mirror $2a$ inevitably becomes the entrance pupil for the group of chief rays reflected by the offset elliptical concave mirror $2a$. In contrast, as the two geometric focal points $f_1$ and $f_2$ of the offset elliptical concave mirror $2a$ are contained inside the closed space formed by the ellipsoid, the optical path of each chief ray traveling from each object point Xa on the object plane 6 of the target object to an arbitrary reflection point $P_1$ (where i=1, 2, . . . , n) on the offset elliptical concave mirror $2a$ will always be taken on the diverging optical path from one geometric focus $f_1$ on the optical axis O of the offset elliptical concave mirror $2a$ to the reflection point $P_1$ (where i=1, 2, . . . , n).

In this manner, by positioning the exit pupil for the beam reflected by the offset elliptical concave mirror $2a$ at the location of one geometric focal point $f_2$ of the offset elliptical concave mirror $2a$, each outgoing beam traveling from each object point Xa on the object plane of the target object toward the offset elliptical concave mirror $2a$ proceeds while passing through a portion of the optical path that propagates with the other geometric focal point $f_1$ of the offset elliptical concave mirror $2a$ as the entrance pupil. That is, before being reflected by the offset elliptical concave mirror $2a$, each chief ray belonging to each beam emitted from each object point Xa on the object plane of the target object propagates on the optical path emitted from the geometric focal point $f_1$ toward the offset elliptical concave mirror $2a$ while diverging with respect to each other, and after reflection by the offset elliptical concave mirror $2a$, converges toward the other geometric focal point $f_2$ of the offset elliptical concave mirror with no aberration.

Accordingly, in the case that the observed target object is spherical, for example, it becomes possible for the offset elliptical concave mirror $2a$ to manage the optical path looking down on the uppermost part (north pole) along the periphery of the sphere and the optical path looking up at the lowermost part (south pole) of the sphere simultaneously, which has the merit that it becomes easier to reliably acquire complete optical information on the object plane.

Note that each diverging beam emitted from Xa along each chief ray emitted from each object point Xa on the object plane 6 while exhibiting divergence is reflected by the offset elliptical concave mirror $2a$, and converges toward the lens $3a$ that has an entrance pupil at the position of the geometric focal point $f_2$ of the offset elliptical concave mirror $2a$. Subsequently, the diverging beams converge at the respective image points $I_a$ of the lens 3. At this time, however, particularly in cases where the object distance coincides with the focal length of the offset elliptical concave mirror $2a$, it goes without saying that the beams directed to the lens $3a$ after being reflected by the offset elliptical concave mirror $2a$ become a parallel bundle.

Third Embodiment

Next, an optical unit using an offset hyperbolic concave mirror will be described.

As illustrated in FIG. 11C, one feature of using the offset hyperbolic concave mirror $2c$ is that the chief ray group from each object point Xc of the object plane incident on the offset hyperbolic concave mirror $2c$ is convergent with respect to the geometric symmetry axis (that is, the optical axis O) of the offset hyperbolic concave mirror $2c$.

The reason that the group of chief rays traveling from each object point Xc on the object plane of the target object toward the offset hyperbolic concave mirror $2c$ exhibit convergence with respect to the optical axis O is as follows.

This means that the optical unit in which a lens $3c$ having an entrance pupil arranged at one geometric focal point $f_2$ of the offset hyperbolic concave mirror $2c$ so as to face the offset hyperbolic concave mirror $2c$ is an optical system in which the exit pupil for the group of chief rays reflected from the offset hyperbolic concave mirror $2c$ is arranged at the geometric focal point $f_2$. Accordingly, the other geometric focal point $f_1$ of the offset hyperbolic concave mirror $2c$ inevitably becomes the entrance pupil for the group of chief rays emitted from each object point on the object plane of the target object and reflected by the offset hyperbolic concave mirror $2c$. In contrast, as this entrance pupil formed at the location of the geometric focal point $f_1$ exists in the convex-side space of the offset hyperbolic concave mirror $2c$ (that is, outside the closed space formed by the hyperboloid), each chief ray emitted from each object point Xc on the object plane existing in the concave-side space of the offset hyperbolic concave mirror $2c$ can only progress toward the other geometric focus $f_1$ with convergence.

In this way, by positioning the exit pupil for the beam reflected by the offset hyperbolic concave mirror $2c$ at the location of the geometric focal point $f_2$ of the offset hyperbolic concave mirror located in the concave-side space of the offset hyperbolic concave mirror $2c$, each beam traveling from each object point Xc on the object plane of the target object toward the offset hyperbolic concave mirror $2c$ proceeds while passing through a portion of the optical path that propagates with the other geometric focal point $f_1$ of the offset hyperbolic concave mirror located in the convex-side space of the offset hyperbolic concave mirror $2c$ as the entrance pupil. That is, before being reflected by the offset hyperbolic concave mirror $2c$, each chief ray belonging to each beam emitted from each object point Xc on the object plane of the target object propagates toward the other geometric focal point $f_1$ while converging with respect to each other, and after reflection by the offset hyperbolic concave mirror $2c$, converges toward one of the geometric focal points $f_2$ with no aberration.

Accordingly, in the case that the observed target object is spherical, for example, the chief rays from the uppermost part (north pole) and lowermost part (south pole) of the sphere are obstructed by the target object itself and do not reach the offset hyperbolic concave mirror 2*c*, which means that one optical unit observing the hemispherical surface of a spherical target object cannot acquire optical information for the entire hemispherical surface (another optical unit of the pair observes the remaining hemispherical surface). However, as this optical property functions advantageously for reducing the size of the concave curved mirror which is necessary for reflecting each beam emitted from each object point Xc on the object plane of the object and passing through the entrance pupil of the lens 3*c*, usage of the offset hyperbolic concave mirror 2*c* is advantageous for achieving a compact size of the entire device.

Noted that each diverging beam emitted from Xc along each convergent chief ray emitted from each object point Xc on the object plane 6 is reflected by the offset hyperbolic concave mirror 2*c*, and converges toward the lens 3*c* that has an entrance pupil at the position of the geometric focal point $f_2$ of the offset hyperbolic concave mirror. Subsequently, the diverging beams converge at the respective image points $I_c$ of the lens 3. At this time, however, particularly in cases when the object distance coincides with the focal length of the offset hyperbolic concave mirror 2*c*, it goes without saying that the beams directed to the lens 3*c* after being reflected by the hyperbolic concave mirror 2*c* become a parallel bundle.

Fourth Embodiment

Further, as a fourth embodiment, by arbitrarily combining the quadric concave surface mirrors depicted in each of the first to third embodiments, an arbitrary concave mirror which allows the local radius of curvature and the conical constant (or alternatively the eccentricity) to continuously vary according to the position and orientation of the concave curved mirror (put generally, a free-form surface, an anamorphic aspherical mirror with no rotational symmetry, or a high-order rotation aspherical mirror) may be used. An example of this is illustrated in FIG. 12.

Figure 12:
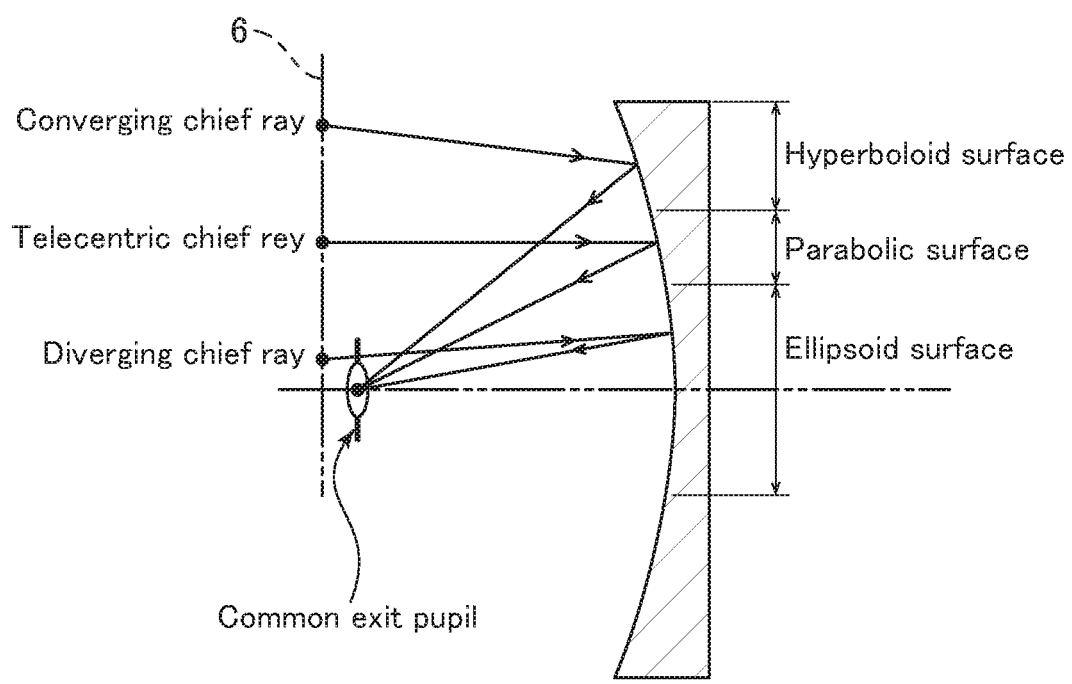
FIG. 12 is a diagram illustrating an example in which the entire concaved mirror is composed of a plurality of partial quadric concave surface mirrors.

In the case of the arbitrary concave mirror illustrated in FIG. 12, the vicinity of the optical axis has an elliptical concave shape, the area outside of that has a parabolic concave shape (paraboloid), and the area further outside that is a hyperbolic concave shape. However, it should be noted that FIG. 12 is merely an example, and which local portion of the concave curved mirror corresponds to which curved surface shape can be arbitrarily combined.

However, even in a case where an arbitrary concave mirror is used that has conical constants that differ depending on the position and direction on the surface, the fact that the entrance pupil of the lens 3 arranged to face the arbitrary concave mirror is associated with the exit pupil for each beam emitted from each object point on the object plane 6 of the target object reflected by the arbitrary concave mirror is exactly the same as in the first to third embodiments. Accordingly, the entrance pupil for the beams from the object plane of the target object that has a conjugate relationship with the exit pupil via the arbitrary concave mirror is formed at a different location depending on the position of the chief ray of each beam reflected by the arbitrary concave mirror. By leveraging this, it is possible to improve the degree of freedom of the inclination angle control of the chief ray traveling from each object point on the object plane of the target object toward the arbitrary concave mirror with respect to the geometric symmetry axis (optical axis) of the arbitrary concave mirror. Using this degree of freedom of the inclination angle control, for example, in a particular section of the optical axis of the arbitrary concave mirror, the type and arrangement of the optical components in the optical unit may be determined such that, while arranging each chief ray to exhibit convergence with respect to each other, each of the chief rays in cross sections orthogonal to the particular section exhibits divergence with respect to each other.

The angle formed by the chief ray and the normal to the target object can be controlled not only by the surface shape of the concave mirror, but can also be controlled by the orientation state of the target object with respect to the concave mirror. An example of this may be realized by the optical unit using the offset parabolic mirror 2 of the first embodiment. Referring once again to the configuration of the optical unit 100 of the first embodiment illustrated in FIG. 7, FIG. 7 is a cross-sectional view illustrating how a group of rays from a plurality of objects (for example, rice grains) arranged on a straight line are incident toward an offset parabolic mirror. In this cross-sectional view, each chief ray belonging to each beam propagates in parallel to the optical axis and is incident on the offset parabolic mirror 2. That is, in the cross section of FIG. 7, as the object plane 6 is arranged so as to be orthogonal to the optical axis of the offset parabolic mirror, the relationship between each principle ray and the object plane is naturally such that an orthogonal relationship is established.

In contrast, FIG. 6 is also a cross-sectional view of the optical unit 100, and illustrates the relationship of the orthogonal cross section in FIG. 7. Unlike the orthogonality between the object plane 6 and the offset parabolic mirror optical axis in FIG. 7, in FIG. 6, the optical axis of the offset parabolic mirror and the object plane 6 are not orthogonal, and as a result, the object plane 6 of the target object is not orthogonal to each chief ray. An operation for preventing the direction of the three-dimensional normal of the object plane from coinciding with the direction of the chief ray is performed in the following configuration as an example. That is, similar to the optical unit of the known sorting machine illustrated in FIG. 14, the sorting machine of the first embodiment relates to a case in which two sets of optical units 100 including the offset parabolic mirror illustrated in FIG. 6 are arranged as a pair so as to face each other and sandwich the target object, and each optical unit 100 images the front and back (left and right) of the target object. Hypothetically, in a case where the optical unit for imaging the front-side half of the object were arranged such that chief rays from each object point on the object plane of the target object were orthogonal to each object plane 6, a part of the illumination means 30 (see FIG. 2) for illuminating the target object in one of the optical units 100 would become a background plate of the other opposing optical unit that images the back-side half of the target object, and the background plate may be superimposed in the field of view of one of the optical units 100. Accordingly, in a case where the object plane of the target object is not orthogonal to the optical axis of the offset parabolic mirror 2, and the positional relationship illustrated in FIG. 6 for capturing images from the oblique direction with respect to the object plane 6 is used, it is possible to avoid issues in which a part of the illumination means 30 in one of the pair of optical units that serves as a background plate for the other optical unit overlaps the field of view of one of the optical units. Note that such an arrangement is meaningful not only in the first embodiment, but similarly applies to each arrangement depicted in the second embodiment to fourth embodiment.

As described herein, the concave mirror included in the optical unit of the device according to the present invention may include an arbitrary concave mirror with a conic curve that forms a concave surface and a radius of curvature that vary according to the position and orientation on the surface, but in consideration of the ease of manufacturing and the manufacturing cost of the concave mirror, generally used quadric concave surface mirrors may also be used in some cases. In this case, by positioning the exit pupil for the beam after reflection by the quadric concave surface mirror at the geometric focal point of one of the quadric concave surface mirrors, with regard to the chief ray that emerges from the object plane of the target object and passes through the center of the exit pupil, the optical path from each object point on the object plane of the target object to the quadric concave surface mirror exhibits a different propagation direction depending on the type of the quadric concave surface mirror. In particular, when the quadric concave surface mirror is a parabolic concave mirror, the optical path becomes parallel to the axis of symmetry of the parabolic concave mirror. In the case that the quadric concave surface mirror is a hyperbolic concave mirror, the optical path exhibits convergence with respect to the symmetry axis of the hyperbolic concave mirror, and when the quadric concave surface mirror is an elliptical concave mirror, the optical path exhibits divergence with respect to the axis of symmetry of the elliptical concave mirror. This similarly applies to the offset quadric concave surface mirror.

In cases where an offset parabolic concave mirror is used as the quadric concave surface mirror due to the optical path propagation characteristics of the chief rays traveling from the object points on the object plane to the quadric concave surface mirror in accordance with the type of the quadric concave surface mirror, it is possible to configure an optical unit that enables a direct downward view of an object plane orthogonal to the geometric symmetry axis of the offset parabolic concave mirror. Accordingly, the diverging beams originating from each object point are reflected as each reflected beam including the chief rays, are gathered at a lens arranged at the geometrical and optical focal position of the offset parabolic concave mirror, and optical information of the target object surface for forming an image of the complete target object can be detected without blind spots.

In addition, when an offset hyperbolic concave mirror is used as the quadric concave surface mirror, as the optical system can be configured using a concave mirror smaller than the size of the field of view at the cost of a reduction of the telecentricity, it is advantageous that trade-offs can be freely made between the degree of blind spots at the periphery of the object plane (the north pole and south pole) of the target object and the degree of miniaturization of the optical unit.

Further, when an offset elliptical concave mirror is used as the quadric concave surface mirror, as advantages can be provided that enable configuration of an optical unit that can image the periphery of the object plane of a target object with a greater dip angle than that of the offset parabolic concave mirror, this facilitates densification of the optical information of the target object.

Whether the quadric concave surface mirror is a parabolic surface, a hyperbolic surface, or an elliptical surface is defined by the conical constant (or alternatively the eccentricity) of the quadric concave surface mirror. In general concave mirrors, the conical constant is allowed to have different values for each cross-section including chief rays that reach the concave mirror from each object point on the object plane of the target object. For example, in a particular cross-section, the concave mirror may correspond to the cross-sectional shape of the elliptical concave mirror, and in another cross section, it may correspond to a cut surface shape of the hyperbolic concave mirror. Such surface shapes are particularly referred to as anamorphic surfaces or alternatively as free-form surfaces. In this case as well, it should be noted that the relationship and effect of the entrance pupil and the exit pupil with respect to the diverging beams from each object point on the object plane are the same as the relationship and effect achieved when the entrance pupil and the exit pupil are placed at the geometric focal point of the quadric concave surface mirror.

In particular, as the device according to the present invention is configured using an optical unit having an offset quadric concave surface mirror, the concave mirror's function of gathering the optical paths and the function of bending the optical paths without aberration in the offset cross-section are simultaneously realized, such that it becomes possible to further reduce the envelope size of the optical unit in the device. At this time, it should be noted that the curvature of the optical path by the quadric concave surface mirror is not made by the bending curvature (tilt angle adjustment) of the offset quadric concave surface mirror itself, but is achieved by the offset (shift). Therefore, even in a case where the bending direction and the bend amount of the reflected light path after reflection by the offset quadric concave surface mirror are selected so as not to interfere with the optical path incident on the quadric concave surface mirror, the suppression of aberration occurrence remains unchanged, and the noted technical advantage in which the optical information for the object plane of the target object does not deteriorate is realized.

INDUSTRIAL APPLICABILITY

In the first embodiment to fourth embodiment, examples have been described of sorting machines that target rice grains, but the present invention is not necessarily limited thereto. For example, it goes without saying that grains other than rice such as soybeans, particulate solids such as coffee beans and seeds, tea leaves and tablets, and furthermore resin pellets containing colored paint from synthetic resins such as automobile bumpers that are processed into pellets in a recycle process can be used as sorting targets for the sorting machine of the present invention. Furthermore, when the target objects are not granular target objects such as rice grains, but are sheet or film-shaped target objects placed on a conveyor, for example, it is possible for the sheet-shaped target objects to be observed from the vertical direction by the optical unit 100, conveyance path modification means on the conveyor may be activated when foreign matrials is detected in the sheet-shaped target object, and only those sheet-shaped target objects that include foreign materials may be conveyed to storage cases for non-standard target objects.

What is claimed is:
1. A device for receiving beams propagating from each of object points on a surface of an object, comprising
an optical unit located to be faced to an offset concaved mirror which allows a local radius of curvature to vary with any location or orientation on a surface of the offset concaved mirror; the optical unit is configured to:
comprise at least one lens;
conform a first optical path associated with a first ray to a second optical path associated with a second ray to determine a direction of a chief ray propagating toward the offset concaved mirror from the each of object points,
wherein the first ray passes a center of an entrance pupil of the lens as the chief ray after beams propagated from any object points on the object surface are reflected by the offset concaved mirror, and the first optical path is a segmented path of the first ray from a reflection point on a surface of the offset concaved mirror to the entrance pupil of the lens, and wherein the second ray is included in a beam propagated from a conjugated point corresponding to the center of entrance pupil, and the second optical path is a path from the reflection point to the entrance pupil of the lens when the beam propagated from the conjugated point is reflected by the offset concaved mirror according to a local radius of curvature at the reflection point; and wherein the diameter of the entrance pupil of the lens is arranged to allow the relating marginal rays of the chief rays to pass through the entrance pupil of the lens, and the object is disposed where the conjugate point for an imaging point of the lens associated with each of the chief rays corresponds to each object point on a surface of the object.

2. The device of claim 1, wherein the offset concaved mirror comprises an offset quadric concave surface mirror, and a shape of which is defined by a centered radius of curvature and a conic constant, and the optical unit is further configured to:

dispose the entrance pupil of the lens at a position of one geometric focal point of the offset quadric concave surface mirror and an optical conjugate point relevant to the center of the entrance pupil of the lens at another geometric focal point; and conform the first optical path for each of the chief rays with the second optical path for each ray in beams propagating from the another geometric focal point when each of the chief rays is propagated toward the one geometric focal point where the entrance pupil of the lens is located after where each of the chief rays are reflected by the offset quadric concave surface mirror.

3. The device of claim 2, wherein when the offset quadric concave surface mirror is an offset-parabolic concaved mirror, the one geometric focal point of the offset-parabolic concaved mirror corresponds to a position of an optically focal point for the offset-parabolic concaved mirror;

the rays from the each object point is focused at the optical focal point without any aberrations, wherein the rays are aiming to the offset-parabolic concaved mirror in parallel to the optical axis of the offset-parabolic concaved mirror; and wherein the rays represents not only the chief ray corresponding to each of the object points on the object but also orthogonal relationship with the surface of the object in at least one cross-section surface including the chief ray.

4. The device of claim 2, wherein when the offset quadric concave surface mirror is an offset-hyperbolic concaved mirror, the one geometric focal point of the offset-hyperboloid concaved mirror corresponds to a position of an on-axial image point in the field created by the offset-hyperbolic concaved mirror, and the another geometric focal point corresponds to the position of the entrance pupil for rays optically aiming to the offset-hyperbolic concaved mirror, and wherein the rays propagating from the object point toward the another geometric focal point configure a group of chief rays corresponding to each of the object points on the object surface, and the group of chief rays aiming to the offset-hyperbolic concaved mirror from the object represents one as a converging beam optically.

5. The device of claim 2, wherein when the offset quadric concave surface mirror is an offset-ellipsoidal concaved mirror, the one geometric focal point of the offset-ellipsoidal concaved mirror corresponds to a position of an on-axial image point in the field created by the offset-ellipsoidal concaved mirror, and the another geometric focal point corresponds to the position of the entrance pupil for rays optically aiming to the offset-ellipsoidal concaved mirror, and wherein the rays propagating from the object point toward to the another geometric focal point configure a group of chief rays corresponding to the each of object point on the object surface and the group of chief rays aiming to the offset-ellipsoidal concaved mirror from the object represents one as a diverging beam optically.

6. The device of claim 1, further comprising at least one light path-bending mirror, wherein the light path-bending mirror is disposed in an optical path of beams until the beams reflected by the offset concaved mirror arrive the entrance pupil.

7. The device of claim 6, wherein the at least one light path-bending mirror works to bend the optical path of the beams more than two times on the mirror surface, which for the beams after the reflection by the offset concaved mirror.

8. The device of claim 6, wherein a propagating direction of the chief ray is shifted/tilted from a theoretically ideal direction when a surface of the offset concaved mirror is not a theoretical shape or the surface is not theoretically disposed, and the shifted/tilted propagating direction is correctly compensated by arranging a reflection direction of the light path-bending mirror.

9. The device of claim 1, wherein a potential anamorphosis of each of the objects as directly aligned is corrected by inclining an optical axis of the lens in a direction which balances out distortion in the anamorphosis relative to the chief ray reflected by the offset concaved mirror.

10. The device of claim 9, wherein the distortion is arranged with mutual inclined angles of a plurality of light path-bending mirrors.

11. The device of claim 1, wherein at least one ray but not the chief ray included in the beam propagated from the each of object points on the surface of the object reaches the imaging point of the lens through the entrance pupil after the at least one ray is reflected by the offset quadric concave surface mirror.

12. An inspection device for determining quality of the object, configured to compare an image detected by using the device in claim 1 with a predetermined criteria or threshold.

13. A separator configured to:

compare an image detected by using the device in claim 1 with a predetermined criteria or threshold to determine quality of the object; and sort the object based on the quality.

* * * * *